United States Patent

McGibbon

[11] Patent Number: 6,139,741
[45] Date of Patent: Oct. 31, 2000

[54] PARALLEL-FLOW FILTER HEAD

[75] Inventor: Donald McGibbon, Southington, Conn.

[73] Assignee: Cuno Incorporated, Meriden, Conn.

[21] Appl. No.: 09/100,626

[22] Filed: Jun. 19, 1998

Related U.S. Application Data

[60] Provisional application No. 60/050,216, Jun. 19, 1997.

[51] Int. Cl.[7] .................................................. B01D 29/50
[52] U.S. Cl. .................. 210/323.1; 210/239; 210/323.2; 210/335; 210/433.1; 210/444; 210/232; 137/545
[58] Field of Search ................................ 210/253, 323.1, 210/323.2, 433.1, 335, 444, 322, 239, 133, 340, 422, 423, 420, 339, 234, 235, 236, 232, 130, 132, 254; 137/545

[56] References Cited

U.S. PATENT DOCUMENTS

| | | |
|---|---|---|
| 1,663,322 | 3/1928 | Tekavec . |
| 1,685,818 | 10/1928 | Kenney . |
| 1,861,805 | 6/1932 | Lentz ....................................... 210/440 |
| 2,978,107 | 4/1961 | Gutkowski et al. ..................... 210/235 |
| 3,540,594 | 11/1970 | Sanderson . |
| 3,598,243 | 8/1971 | Gutkowski ............................... 210/340 |
| 3,721,270 | 3/1973 | Wittgenstein . |
| 4,192,750 | 3/1980 | Elfes et al. . |
| 4,274,549 | 6/1981 | Germain . |
| 4,324,213 | 4/1982 | Kasting et al. . |
| 5,290,445 | 3/1994 | Buttery . |
| 5,354,464 | 10/1994 | Slovak et al. . |
| 5,545,242 | 8/1996 | Whitlock et al. . |

FOREIGN PATENT DOCUMENTS

WO 88/08324  11/1988  WIPO .

*Primary Examiner*—W. L. Walker
*Assistant Examiner*—Terry K. Cecil
*Attorney, Agent, or Firm*—Cummings & Lockwood; James W. Jakobsen

[57] ABSTRACT

A filter system (50) includes first and second filter heads each including a housing receptacle and a filter receptacle. The second filter head (10) includes an inlet (42) providing fluid communication to the housing receptacle; an unfiltered-fluid outlet (44) connected to the inlet of the first filter head (9) via an unfiltered-fluid line (64); and a filtered-fluid outlet (46) providing fluid communication to the filter receptacle and connected to the filtered-fluid opening (32) of the first head via a filter-fluid line (62). A filtered-fluid outlet (47) is provided in the first head for filtered fluid to leave the system. A plug (34) is also included to prevent fluid communication between the filtered- and unfiltered-fluid outlets within the bore (24) of the second filter head.

7 Claims, 5 Drawing Sheets

FIG_1

FIG_6

PARALLEL-FLOW FILTER HEAD

RELATED APPLICATION

This application claims priority of commonly owned U.S. Provisional Patent Application Ser. No. 60/050,216, filed Jun. 19, 1997, the disclosure of which is herein incorporated by reference.

BACKGROUND OF THE INVENTION

The present invention relates generally to a filter system and, more particularly, to a filter head for use with a filter system. Even more particularly, the present invention relates to a filter system having two or more filter heads interconnected to provide parallel-flow.

Filter systems are used to filter fluids such as water, oil and gasoline, for example, and the systems include at least one filter unit. A filter unit generally includes a filter head, a filter housing and a filter element. The filter housing contains the filter element and serves as both a pressure vessel and a sump or bowl. Contaminated fluid is pumped into the filter housing and through the filter element to produce filtered fluid. The filter head seals the filter element within the housing and includes an inlet for directing the contaminated fluid into the housing and an outlet for drawing the filtered fluid out of the filter element.

A particular existing filter head includes a base having a filter receptacle and a housing receptacle, an outer surface extending from the base, first and second bores extending inwardly from the outer surface, a first port connecting the first bore to the housing receptacle, and a second port connecting the second bore to the filter receptacle. Thus, the first port and the first bore comprise an inlet, while the second bore and the second port comprise an outlet.

Often, combining two or more filter units into a larger parallel-flow filter system is desirable such as, for example, when there is a large volume of contaminated fluid to be filtered or when the contaminated fluid is highly contaminated.

Normally a system is made by simply connecting two or more existing filter heads such that all inlets of the heads are connected to a single unfiltered-fluid line and all outlets of the heads are connected to a filtered-fluid line. While this configuration beneficially allows the use of the same filter heads for both single filter units and parallel-flow filter systems, the resulting parallel-flow filter system is relatively large and includes many conduit connections. Fewer conduit connection are preferred since conduit connections provide areas for potential leaks.

What is desired, accordingly is an improved filter head that can be easily stacked, or operatively connected, with other, similar, filter heads to form a parallel-flow filter system. What is also desired is a parallel-flow filter system that is more compact, has fewer conduit connections and is less expensive to produce than the above described existing system. What is further desired is a filter head that can be used in both a standalone filter unit and a parallel-flow filter system.

SUMMARY OF THE INVENTION

An object, therefore, of the present invention is to provide an improved filter head that can be easily stacked, or operatively connected, with other, similar, filter heads to form a parallel-flow filter system.

Another object of the present invention is to provide an improved filter head from an existing filter head.

An additional object of the present invention is to provide a method of improving an existing filter head.

A further object of the present invention is to provide a parallel-flow filter system having relatively few conduit connections.

Still another object of the present invention is to provide a parallel-flow filter system that is relatively compact in size.

Yet an additional object of the present invention is to provide a filter head that can be used in both a stand-alone filter unit and a parallel-flow filter system.

The present invention meets these and other objects by providing an improved filter head including a base having a filter receptacle and a housing receptacle, an outer surface extending from the base, first and second bores extending inwardly from the outer surface, a first port connecting the first bore to the housing receptacle, and a second port connecting the second bore to the filter receptacle. The improvement includes a plug within the second bore, preventing fluid communication between the second port and the outer surface, an unfiltered-fluid opening connecting the second bore, between the plug and the outer surface, and the housing receptacle, and a filtered-fluid opening extending between the outer surface and the second bore, between the second port and the plug.

Thus, an inlet of the filter head comprises the first bore and the first port, while an unfiltered-fluid outlet comprises the unfiltered-fluid opening and the second bore between the plug and the side surface, and a filtered-fluid outlet comprises the second port, the filtered-fluid opening, and the second bore between the plug and the end of the bore. Whereby, the improved head is ideal for use in a parallel-flow filter system.

A method of converting an existing filter head is also provided. The filter head includes a base having a filter receptacle and a housing receptacle, an outer surface extending from the base, first and second bores extending inwardly from the outer surface, a first port connecting the first bore to the housing receptacle, and a second port connecting the second bore to the filter receptacle. The method includes plugging the second bore to prevent fluid communication between the second port and the outer surface, forming an unfiltered-fluid opening from the housing receptacle to the second bore, between the plug and the outer surface, and forming a filtered-fluid opening from the outer surface to the second bore, between the second port and the plug.

The present invention provides a filter head including a base having a filter receptacle and a housing receptacle, and an outer surface extending from the base. An inlet extends between the outer surface and the housing receptacle, while an unfiltered-fluid outlet extends between the outer surface and the housing receptacle, and a filtered-fluid outlet extends between the outer surface and the filter receptacle.

The present invention also provides a parallel-flow filter system including at least two filter heads. The first filter head includes a filter receptacle, a housing receptacle, an inlet providing fluid communication to the housing receptacle, a filtered-fluid outlet providing fluid communication to the filter receptacle, and a filtered-fluid opening connected to the filtered-fluid outlet. The second filter head includ a filter receptacle, a housing receptacle, an inlet providing fluid communication to the housing receptacle, an unfiltered-fluid outlet providing fluid communication to the housing receptacle, and a filtered-fluid outlet providing fluid communication to the filter receptacle. The filter system also includes an unfiltered-fluid line connecting the unfiltered-fluid outlet of the second head to the inlet of the first head, and a filtered-fluid line connecting the filtered-fluid outlet of the second head to the filtered-fluid opening of the first head.

Other objects and advantages of the invention will be apparent from the following description, the accompanying drawings and the appended claims.

DETAILED DESCRIPTION OF THE INVENTION

Figure 1:
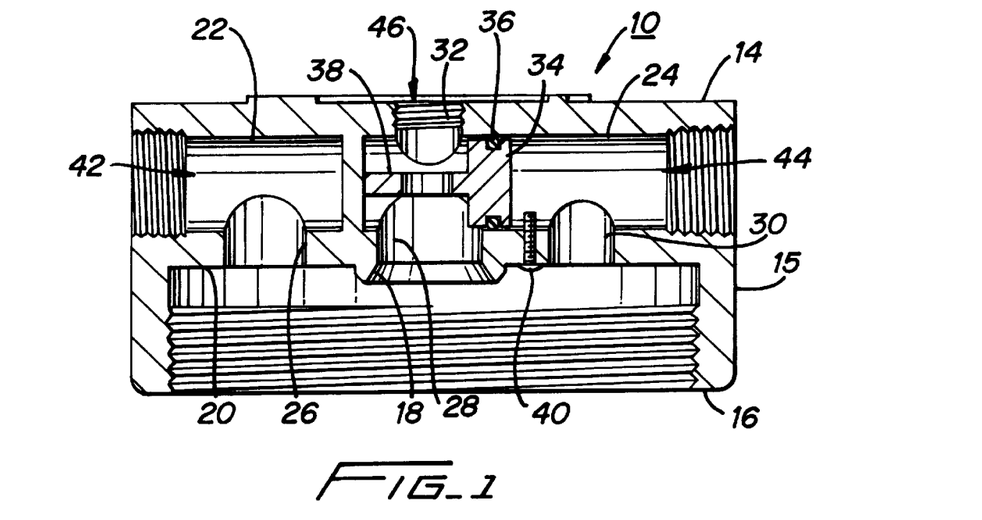
FIG. 1 is a front sectional view of a filter head according to the present invention.

Referring first to FIG. 1, a filter head 10 according to the present invention is shown. The head 10 is generally cylindrical and includes a top surface 14, a side surface 15, and a base 16. Formed in the base 16 is a filter receptacle 18 coaxially surrounded by a housing receptacle 20.

The filter head 10 also includes first and second bores 22, 24, which are preferably diametrically opposed and extend radially inwardly from the side surface 15. A first port 26 extends between the housing receptacle 20 and the first bore 22 while a second port 28 extends between the filter receptacle 18 and the second bore 24. An unfiltered-fluid opening 30 extends between the housing receptacle 20 and the second bore 24, while a filtered-fluid opening 32 extends between the top surface 14 and the second bore 24 above the second port 28. It should be noted that the filtered-fluid opening 32 can alternatively extend from the side surface 15.

The filter head 10 additionally includes a plug 34 positioned within the second bore 24 between the second port 28 and the unfiltered-fluid opening 30. The plug 34 includes a peripheral o-ring 36 and a spacer 38. The o-ring 36 ensures a fluid-tight seal between the plug 34 and the inner surface of the second bore 24, while the spacer 38 spaces the plug 34 from the end of the second bore such that fluid communication between the second port 28 and the filtered-fluid opening 32 remains. A retaining screw 40 extends into the second bore 24 from the housing receptacle 20 to retain the plug 34 within the bore.

Thus, an inlet 42 of the filter head 10 comprises the first bore 22 and the first port 26, while a unfiltered-fluid outlet 44 comprises the unfiltered-fluid opening 30 and the second bore 24 between the plug 34 and the side surface 15, and a filtered-fluid outlet 46 comprises the second port 28, the filtered-fluid opening 32, and the second bore 24 between the plug 34 and the end of the bore.

The filter head 10 of FIG. 1 is made by modifying, or improving, a particular, existing filter head, which simply includes an inlet formed by the first bore 22 and the first port 26 and an outlet formed by the second port 28 and the second bore 24. A method of modifying the existing filter head includes forming the filtered-fluid opening 32 and the unfiltered-fluid opening 30, and plugging the second bore 24 with the plug 34 and the set-screw 40.

Many benefits are achieved in modifying an existing filter head for use in a parallel-flow filter head assembly. For example, filter heads produced from the same molds can be used in a stand-alone filter unit or modified according to the present invention for use in a filter system having multiple filter units. In addition, existing, or after-market filter units can be modified for use in parallel-flow filter systems.

Figure 2:
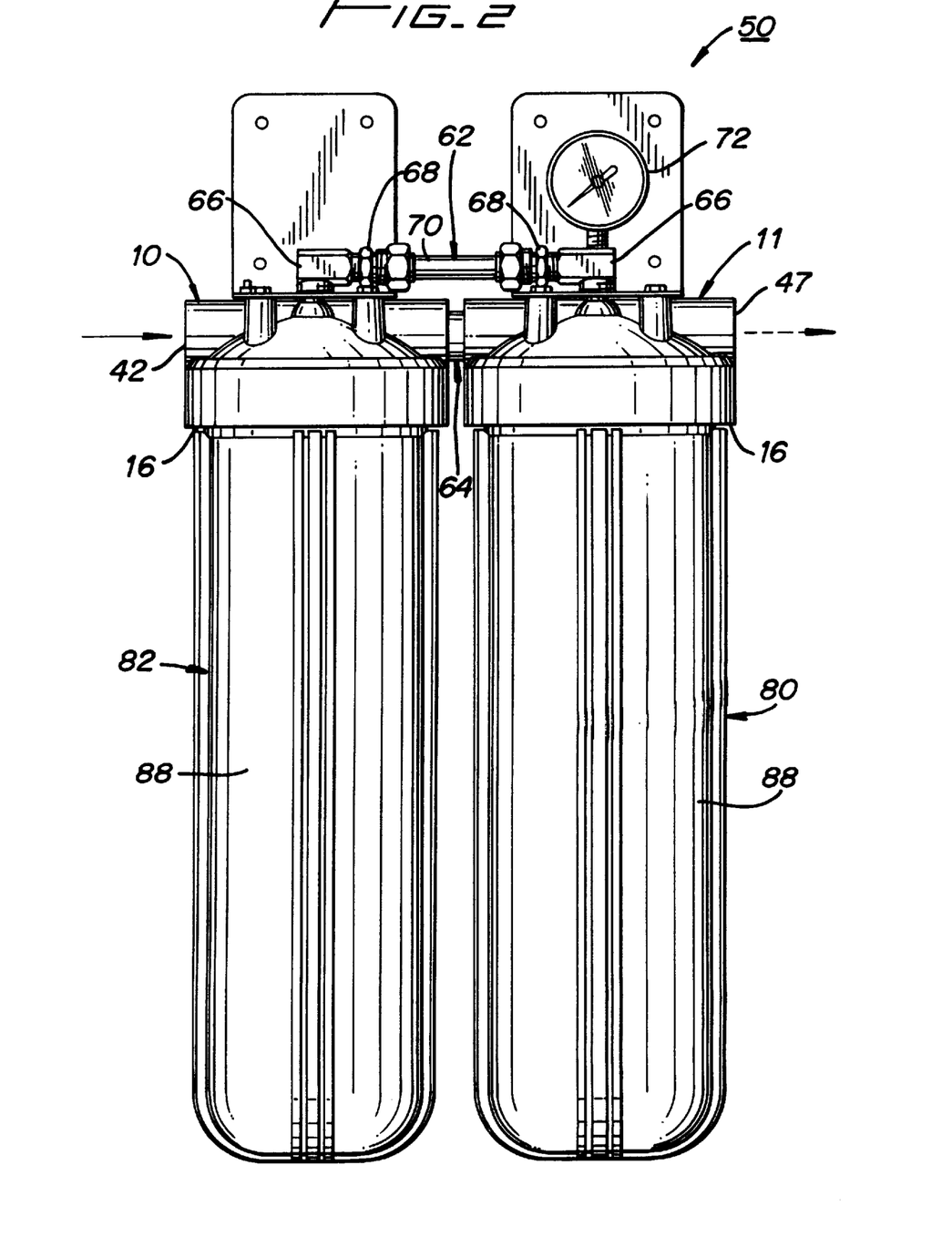
FIG. 2 is a front elevation view of a parallel-flow filter system according to the present invention incorporating the filter head of FIG. 1.
Figure 3:
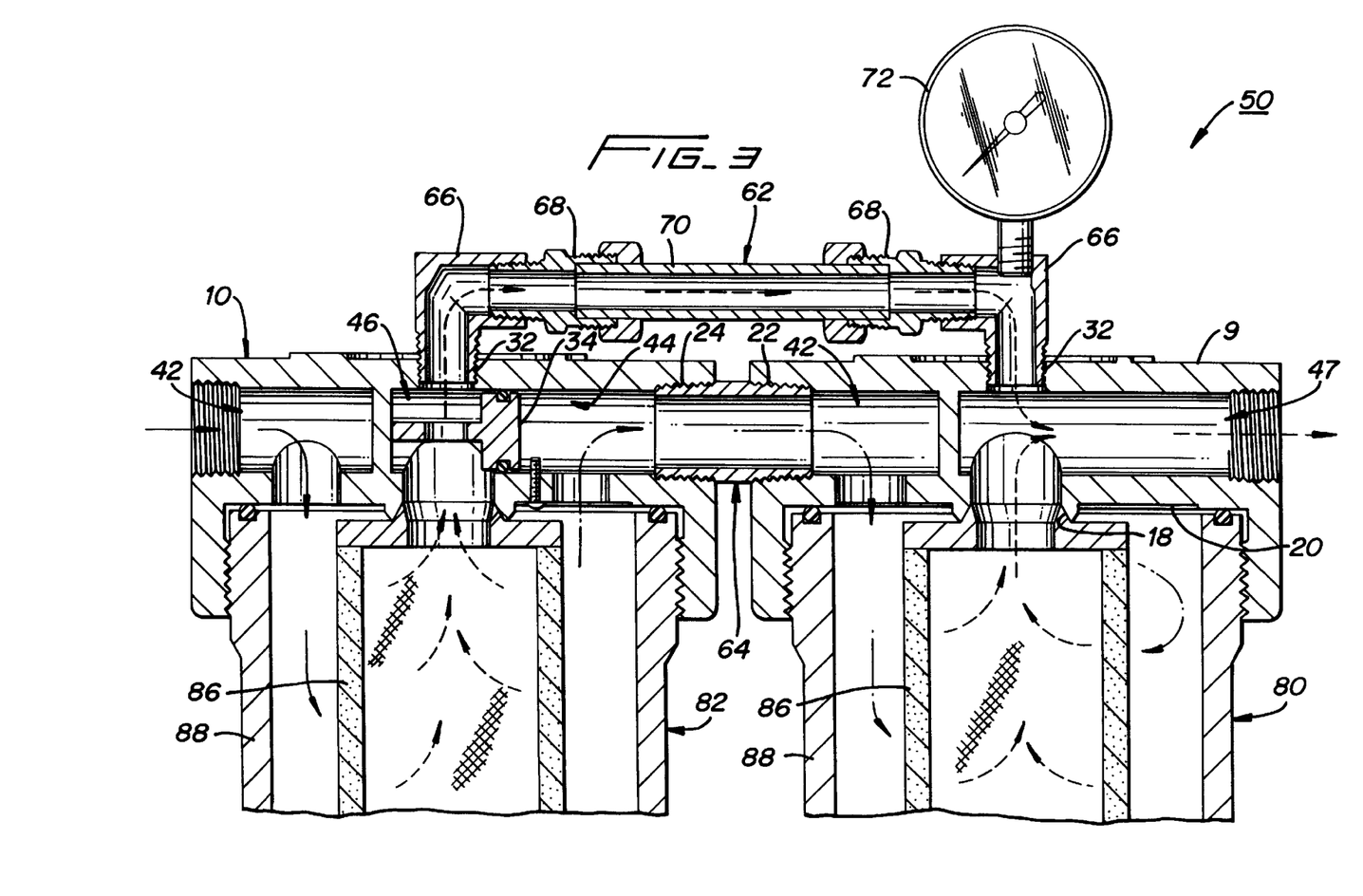
FIG. 3 is a front sectional view of a portion of the system of FIG. 2.

Referring to FIGS. 2 and 3, a filter system 50 according to the present invention is shown. The system 50 includes two filter units 80, 82.

As shown, the filter system 50 also includes a first filter head 9 and the filter head 10 of FIG. 1, referred to hereinafter as the second filter head. The first filter head 9 is similar to the second filter head 10 but does not include the plug 34 or the filtered-fluid opening 30 of the second filter head. Thus, a filtered-fluid outlet 47 of the first filter head 9 comprises the second port 28 and the second bore 24. Remaining elements of the first and the second filter heads 9, 10 that are the same have the same reference numerals.

The filter system 50 additionally includes a filtered-fluid line 62 connecting the filtered-fluid outlet 46 of the second filter head 10 to the filtered-fluid outlet 47 of the first filter head 9, and an unfiltered-fluid line 64 connecting the unfiltered-fluid outlet 44 of the second filter head to the inlet 42 of the first filter head.

In the particular embodiment shown, the unfiltered-fluid line 64 is threadedly connected between the second bore 24 of the second filter head 10 and the first bore 22 of the first filter head 9. The filtered-fluid line 62 comprises elbows 66 threadedly received by the filtered-fluid openings 32 of the first and the second filter heads 9, 10. Compression couplings 68 are threadedly received by the elbows 66 and secure a conduit 70 between the elbows in a fluid-tight manner. It should be understood that the unfiltered-fluid line 64 and the filtered-fluid line 62 can each alternatively comprise any suitable combination of conduits, connectors and fittings. In addition, the filter heads 9, 10 and the filtered and the unfiltered-fluid lines 62, 64 can be made of any suitable corrosion-resistant material, such as stainless steel, aluminum and/or plastic, for example. The system 50 can also include a gauge 72 for displaying pressure or flow rate, for example.

Each filter unit 80, 82 includes a filter element 86 and a filter housing 88. The filter elements 86 are received within the filter receptacles 18 of the filter heads 9, 10, while the filter housings 88 are received in the housing receptacles 20. In the particularly embodiment shown, the housings 88 are threadedly received and thus secured to the housing receptacles 20, retaining the filter elements 86 therein. It should be noted that all thread connections in the filter system 50 can be supplemented with Teflon tape or putty to ensure fluid-tightness of all joints.

In operation, as shown by solid-lined arrows, contaminated fluid is directed into the inlet 42 of the second filter head 10 and deposited between the housing 88 and the filter element 86 of the second filter unit 82. Depending upon system pressure and flow rate of the fluid, a predetermined portion of the contaminated fluid passes through the filter element 86 of the second unit 10 and is thus filtered. The filtered fluid, as shown by the broken-lined arrows, then passes out of the second filter unit 10, through the filtered-fluid line 62 and into the filtered-fluid outlet 47 of the first filter unit 9.

The remaining portion of the contaminated fluid within the second filter unit 10 remains unfiltered and, as shown by the dashed and dotted arrows, passes out of the unfiltered-fluid outlet 44 of the second filter head, through the unfiltered-fluid line 64 and the inlet 42 of the first head 9 into the housing 88 of the first filter unit 80. The unfiltered fluid then passes through the filter element 86 of the first filter unit 80, is thus filtered, and joins the filtered fluid from the second filter unit 82 in the filtered-fluid outlet 47 of the first filter head, wherein all filtered fluid leaves the system 50.

Figure 4:
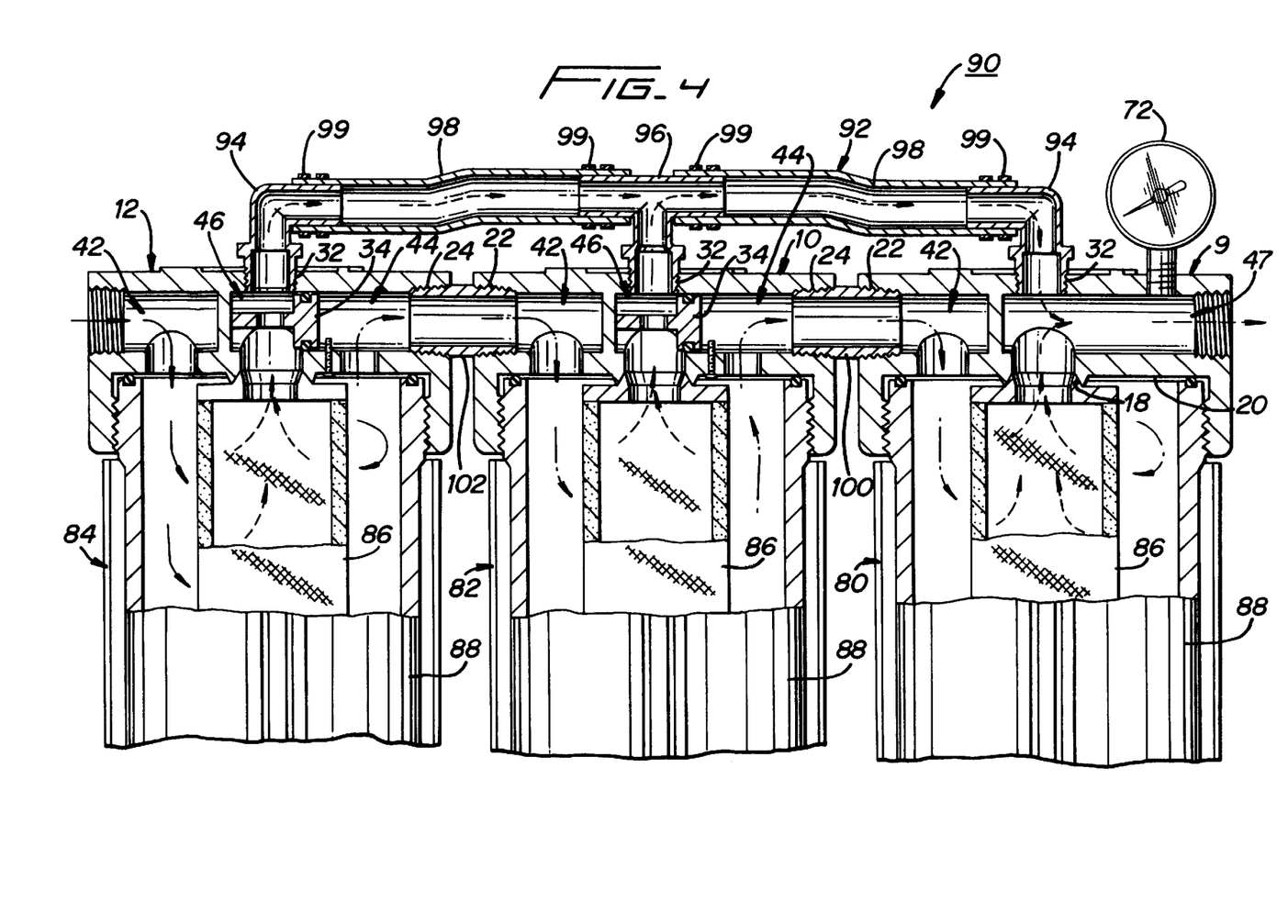
FIG. 4 is a front sectional view of a portion of another parallel-flow filter system according to the present invention.

Referring now to FIG. 4, another filter system 90 according to the present invention is shown. This filter system 90 is similar to the filter system 50 of FIGS. 2 and 3, and elements that are the same have the same reference numerals. In addition to the first and the second filter units 80, 82, the filter system 90 includes a third filter unit 82, and a third filter head 12 that is identical to the second filter head 10.

The filter system 90 includes a filtered-fluid line 92 and first and second unfiltered-fluid lines 100, 102. The filtered-fluid line 92 connects the filtered-fluid outlets 44, 47 of each filter head 9, 10, 12, while the first unfiltered-fluid line 100 connects the unfiltered-fluid outlet 44 of the second head to the inlet 42 of the first head 9, and the second unfiltered-fluid line 102 connects the unfiltered-fluid outlet 44 of the third head 12 to the inlet 42 of the second head 10.

In particular, the first and the second unfiltered-fluid lines 100, 102 are, respectively, threadedly received between the second bore 24 of the second head 10 and the first bore 22 of the first head 9, and threadedly received between the second bore 24 of the third head 12 and the first bore 22 of the second head. The filtered-fluid line 92 comprises elbows 94 threadedly received in the filtered-fluid openings 32 of the first and the third filter heads 9, 12, a tee-fitting 96 threadedly received in the filtered-fluid opening 32 of the second head 10, conduits 98 extending between the elbows and the tee-fitting, and secured with clamps 99 in a fluid-tight manner. Again, it should be understood that the unfiltered-fluid lines 100, 102 and the filtered-fluid line 92 can each alternatively comprise any suitable combination of conduits, connectors and fittings.

The operation of the filter system 90 is illustrated by the arrows. The solid-lined arrows indicate the flow of contaminated fluid into the inlet 42 of the third filter unit 12, while the dashed and dotted arrows indicate the flow of unfiltered fluid through the filter heads 9, 10, 12 and the three filter units 80, 82, 84. The broken-lined arrows indicate the flow of filtered fluid through the filter heads 9, 10, 11 and the three filter units 80, 82, 84, and ultimately out of the filtered-fluid outlet 47 of the first filter head 9.

It should be noted that a filter system according to the present invention can include more than three filter units, as is appropriate. A fourth filter head will be identical to the second filter head 10, and will be operatively connected to the third filter head 12 just as the third filter head is operatively connected to the second filter head. In sum, each additional filter head will be identical to the second filter head 10, and will be operatively connected to the last filter head just as the third filter head 12 is operatively connected to the second filter head.

Figure 5:
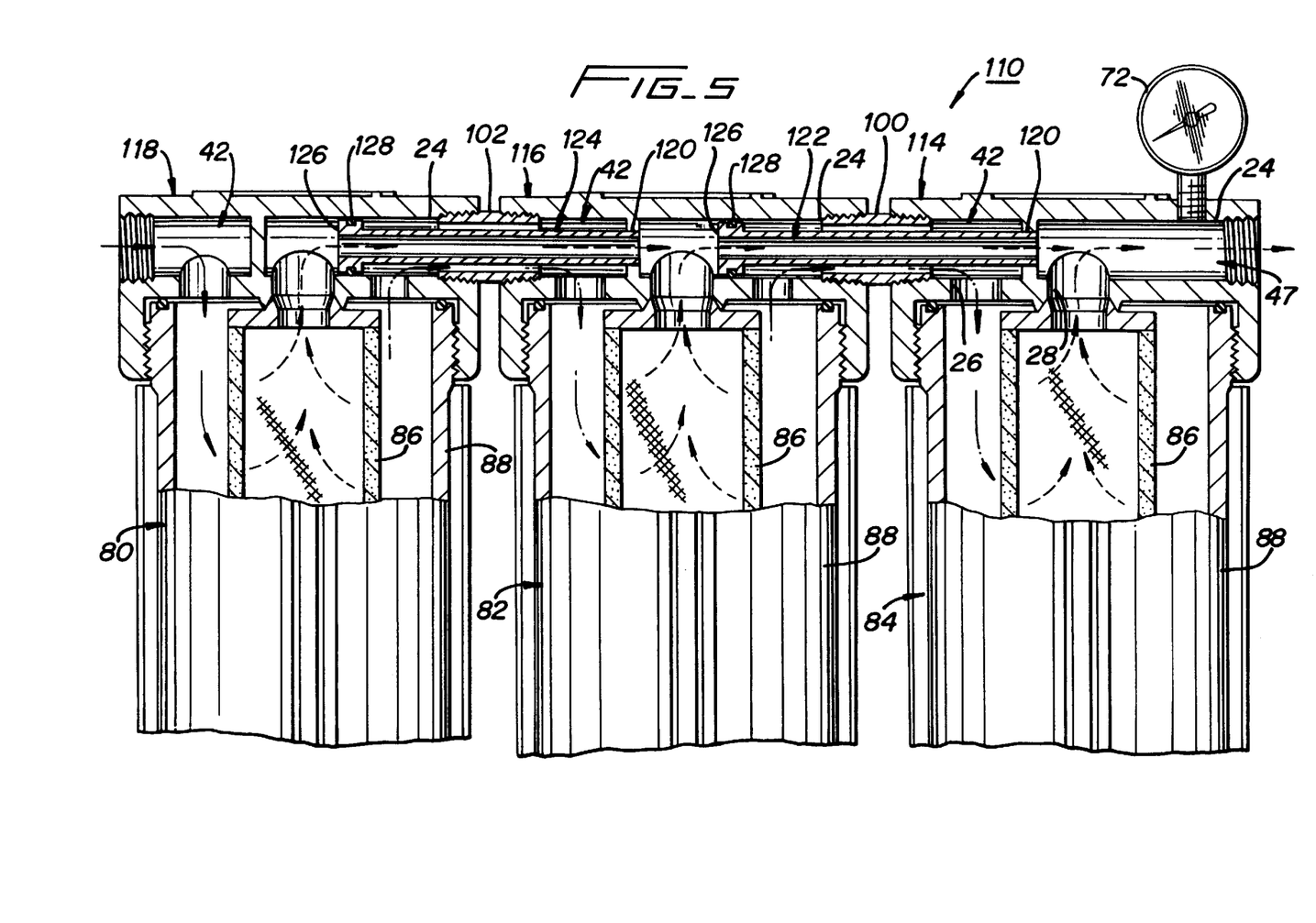
FIG. 5 is a front sectional view of a portion of an additional parallel-flow filter system according to the present invention.

Referring now to FIG. 5 an additional filter system 110 according to the present invention is shown. This filter system 110 provides the benefit of being even more compact than the filter system 90 of FIG. 4. However, the filter system 110 is similar to the system 90 of FIG. 4 and elements that are the same have the same reference numerals.

The system 110 includes first, second and third filter heads 114, 116, 118, a first and a second filtered-fluid line 122, 124, and the unfiltered-fluid lines 100, 102. The first filter head 114 is similar to the first filter head 9 of FIG. 4, but has a filtered-fluid opening 120 that extends between the first and the second bores 22, 24, instead of between the top surface 14 and the second bore 24. The second filter head 116 is similar to the second filter head 10 of FIG. 4, but does not include a plug 34 and has a filtered-fluid opening 120 that extends between the first and the second bores 22, 24. The third filter head 118 is also similar to the second filter head 10 of FIG. 4, but does not include a plug 34 or a filtered-fluid opening 30.

The system 110 is made compact by coaxially positioning the filtered-fluid lines 122, 124 within the unfiltered-fluid lines 100, 102. Each filtered-fluid line 122, 124 includes a radially outwardly flanged end 126 having a peripheral o-ring 128. The first filtered-fluid line 122 extends between the second and the first heads 116, 114, with its flanged end 126 received by the second bore 24 of the second head, between the second port 28 and the unfiltered-fluid opening 30, and its opposite end secured within the filtered-fluid opening 120 of the first head. The second filtered-fluid line 124 extends between the third and the second heads 118, 116, with its flanged end 126 received by the second bore 24 of the third head, between the second port 28 and the unfiltered-fluid opening 30, and its opposite end secured within the filtered-fluid opening 120 of the second head.

The operation of the filter system 110 is illustrated by arrows. The solid-lined arrows indicate the flow of contaminated fluid into the inlet 42 of the third filter head 118, while the dashed and dotted arrows indicate the flow of unfiltered fluid through the filter heads 114, 116, 118 and the three filter units 80, 82, 84. The broken-lined arrows indicate the flow of filtered fluid through the filter heads 114, 116, 118 and the three filter units 80, 82, 84 and ultimately out of the filtered-fluid outlet 47 of the first head 114.

Figure 6:
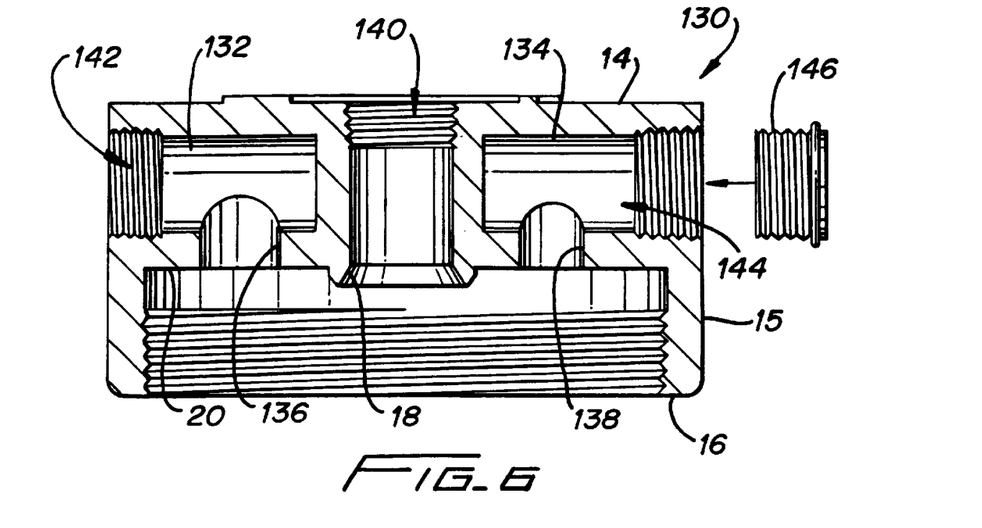
FIG. 6 is a front sectional view of another filter head according to the present invention.

Referring now to FIG. 6, another filter head 130 according to the present invention is shown. The filter head 130 is specifically molded or formed for use in the filter systems 50, 90 of FIGS. 2 through 4. The head 130 is similar to the head 10 of FIG. 1, and elements that are the same have the same reference numeral.

The filter head 130 of FIG. 6, however, is made, or molded, specifically for use as part of the filter systems 50, 90 of FIGS. 2 through 4. The head 130 includes first and second bores 132, 134, a first port 136 extending between the housing receptacle 20 and the first bore 132, a second port 138 extending from the housing receptacle 20 to the second bore 134, and a third port 140 extending from the filter receptacle 18 to the top surface 14. The first bore 132 and the first port 136 form an inlet 142, while the second port 138 and the second bore 134 form an unfiltered-fluid outlet 144, and the third vertical port 140 forms a filtered-fluid outlet. The head 130 can also be provided with a plug 146 for sealing in a fluid-tight manner the unfiltered-fluid outlet 144 such that the head can be used with a stand-alone filter unit.

It should be noted that the filtered-fluid outlet can alternatively be comprised of a horizontal bore and vertical port similar to the inlet 142 and the unfiltered-fluid outlet 144, and that the inlet 142 and the unfiltered-fluid outlet 144 can alternatively comprise vertical ports extending between the top surface 14 and the housing receptacle 20.

While the filter heads, filter units, filter head assemblies and filter systems described above constitute preferred embodiments of the invention, it is to be understood that the invention is not limited to these particular embodiments, and that changes may be made therein without departing from the spirit and the scope of the invention as defined in the appended claims.

What is claimed is:

1. A filter system comprising:
   A.) at least two filter heads,
      i.) the first filter head including,
         a filter receptacle,
         a housing receptacle,
         an inlet providing fluid communication to the housing receptacle,
         a filtered-fluid outlet providing fluid communication to the filter receptacle, and
         a filtered-fluid opening connected to the filtered-fluid outlet,
      ii.) the second filter head including,
         a filter receptacle,
         a housing receptacle,
         an inlet providing fluid communication to the housing receptacle,
         an unfiltered-fluid outlet providing fluid communication to the housing receptacle, and
         a filtered-fluid outlet providing fluid communication to the filter receptacle;
   B.) an unfiltered-fluid line connecting the unfiltered-fluid outlet of the second head to the inlet of the first head; and
   C.) a filtered-fluid line connecting the filtered-fluid outlet of the second head to the filtered-fluid opening of the first head.

2. The filter system of claim 1 further comprising:
   A.) a third filter head including,
      a filter receptacle,
      a housing receptacle,
      an inlet providing fluid communication to the housing receptacle,
      an unfiltered-fluid outlet providing fluid communication to the housing receptacle, and
      a filtered-fluid outlet providing fluid communication to the filter receptacle;
   B.) a second unfiltered-fluid line connecting the unfiltered-fluid outlet of the third head to the inlet of the second head; and
   C.) the filtered-fluid line connecting the filtered-fluid outlet of the third head to the filtered-fluid outlet of the second head and the filtered-fluid opening of the first head.

3. The filter system of claim 1 wherein:
   A.) the first filter head includes,
      a base having the filter receptacle and the housing receptacle,
      an outer surface extending from the base,
      a first bore and a second bore extending inwardly from the outer surface, with the filtered-fluid opening extending between the outer surface and the second bore,
      a first port connecting the first bore to the housing receptacle, the inlet comprising the first port and the first bore, and
      a second port connecting the second bore to the filter receptacle, the filtered-fluid outlet comprising the second port and the second bore;
   B.) the second filter head including,
      a base having the filter receptacle and the housing receptacle,
      an outer surface extending from the base,
      a first bore and a second bore extending inwardly from the outer surface,
      a first port connecting the first bore to the housing receptacle, the inlet comprising the first port and the first bore,
      a second port connecting the second bore to the filter receptacle,
      a plug within the second bore preventing fluid communication between the second port and the outer surface,
      a filtered-fluid opening extending between the outer surface and the second bore, between the second port and the plug, so that the filtered-fluid outlet comprises the second port, the filtered-fluid opening, and the second bore between the second port and the plug,
      an unfiltered-fluid opening extending between the housing receptacle and the second bore, between the plug and the outer surface, so that the unfiltered-fluid outlet comprises the unfiltered-fluid opening and the second bore, between the plug and the outer surface;
   C.) the unfiltered-fluid line connecting the second bore of the second head to the first bore of the first head; and
   D.) the filtered-fluid line connecting the filtered-fluid opening of the second filter head to the filtered-fluid opening of the first head.

4. The filter system of claim 1 wherein:
   A.) the first filter head includes,
      a base having the filter receptacle and the housing receptacle,
      an outer surface extending from the base,
      a first bore and a second bore extending inwardly from the outer surface, with the filtered-fluid opening extending between the first and the second bores,
      a first port connecting the first bore to the housing receptacle, the inlet comprising the first port and the first bore, and
      a second port connecting the second bore to the filter receptacle, the filtered-fluid outlet comprising the second port and the second bore;
   B.) the second filter head including,
      a base having the filter receptacle and the housing receptacle,
      an outer surface extending from the base,
      a first bore and a second bore extending inwardly from the outer surface,
      a first port connecting the first bore to the housing receptacle, the inlet comprising the first port and the first bore,
      the unfiltered-fluid opening extending between the housing receptacle and the second bore, and
      a second port connecting the second bore to the filter receptacle;
   C.) the unfiltered-fluid line connecting the second bore of the second head to the first bore of the first head; and
   D.) the filtered-fluid line coaxially extending within the unfiltered-fluid line and having a radially outwardly flanged end received in a fluid-tight manner by the second bore of the second filter head, between the second port and the unfiltered-fluid opening, such that the filtered-fluid outlet of the second head comprises the second port and the second bore, between the second port and the flanged end of the filtered-fluid line, and the unfiltered-fluid outlet comprises the unfiltered-fluid opening and the second bore, between the flanged end and the outer surface, with an opposite end of the filtered-fluid line received in a fluid-tight manner by the filtered-fluid opening of the first head.

5. The filter system of claim 4 wherein:

A.) the second filter head further includes a filtered-fluid opening extending between the first and the second bores of the second filter head, the system further comprises, B.) a third filter head including,
a base having a filter receptacle and a housing receptacle,
an outer surface extending from the base,
a first bore and a second bore extending inwardly from the outer surface,
a first port connecting the first bore to the housing receptacle,
a second port connecting the second bore to the filter receptacle, and
an unfiltered-fluid opening extending between the housing receptacle and the second bore;

C.) a second unfiltered-fluid line connecting the second bore of the third filter head to the first bore of the second filter head; and D.) a second filtered-fluid line coaxially extending within the second unfiltered-fluid line and having a radially outwardly flanged end received in a fluid-tight manner by the second bore of the third filter head, between the second port and the unfiltered-fluid opening, and an opposite end received in a fluid-tight manner by the filtered-fluid opening of the second head.

6. The filter system of claim 1 further comprising:

A.) a first filter unit including,
a filter element received in the filter receptacle of the first filter head, and
a filter housing received in the housing receptacle of the first filter head; and B.) a second filter unit including,
a filter element received in the filter receptacle of the second filter head, and
a filter housing received in the housing receptacle of the second filter head.

7. A method of converting a filter head including a base having a filter receptacle and a housing receptacle, an outer surface extending from the base, first and second bores extending inwardly from the outer surface, a first port connecting the first bore to the housing receptacle, and a second port connecting the second bore to the filter receptacle, the method comprising:

plugging the second bore to prevent fluid communication between the second port and the outer surface;

forming an unfiltered-fluid opening from the housing receptacle to the second bore, between the plug and the outer surface; and forming a filtered-fluid opening from the outer surface to the second bore, between the second port and the plug.

* * * * *